(12) United States Patent
Jang et al.

(10) Patent No.: US 8,836,610 B2
(45) Date of Patent: Sep. 16, 2014

(54) DISPLAY DEVICE AND DRIVING METHOD THEREOF

(75) Inventors: Jae-woo Jang, Suwon-si (KR); Chul-woo Lee, Asan-si (KR); Nam-sik Ko, Asan-si (KR); Neung-beom Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 812 days.

(21) Appl. No.: 12/157,156

(22) Filed: Jun. 5, 2008

(65) Prior Publication Data

US 2009/0096711 A1 Apr. 16, 2009

(30) Foreign Application Priority Data

Oct. 15, 2007 (KR) .................... 10-2007-0103579

(51) Int. Cl.
*G09G 5/00* (2006.01)
*G06F 3/14* (2006.01)

(52) U.S. Cl.
CPC ............ *G06F 3/1446* (2013.01); *G06F 3/1438* (2013.01); *G09G 2310/0232* (2013.01); *G06F 3/1431* (2013.01)
USPC ............................................. 345/1.3; 345/1.1

(58) Field of Classification Search
USPC .................... 345/1.1–3.4, 76–83, 87–104
See application file for complete search history.

(56) References Cited

U.S. PATENT DOCUMENTS

| | | | | |
|---|---|---|---|---|
| 5,105,183 A | * | 4/1992 | Beckman | 345/1.3 |
| 5,606,336 A | * | 2/1997 | Yuki | 345/1.1 |
| 6,583,771 B1 | * | 6/2003 | Furuhashi et al. | 345/1.1 |
| 7,777,691 B1 | * | 8/2010 | Nimmer et al. | 345/1.3 |
| 2002/0093626 A1 | * | 7/2002 | Asamura | 353/30 |
| 2002/0130987 A1 | | 9/2002 | Rajeswaran et al. | |
| 2002/0154259 A1 | | 10/2002 | Freidhoff et al. | |
| 2005/0057434 A1 | * | 3/2005 | Youn | 345/1.3 |
| 2005/0083331 A1 | | 4/2005 | MacKinlay | 345/473 |
| 2005/0140567 A1 | * | 6/2005 | Ishizu et al. | 345/1.3 |
| 2005/0259084 A1 | * | 11/2005 | Popovich et al. | 345/173 |
| 2006/0001593 A1 | * | 1/2006 | Baudisch | 345/1.1 |

(Continued)

FOREIGN PATENT DOCUMENTS

CN 101009852 A 8/2007
JP 6-259048 9/1994

(Continued)

OTHER PUBLICATIONS

Patent Abstracts of Japan, Publication No. 06-259048, Sep. 16, 1994, 1 p.

(Continued)

*Primary Examiner* — Alexander Eisen
*Assistant Examiner* — Nelson Lam
(74) *Attorney, Agent, or Firm* — Innovation Counsel LLP

(57) ABSTRACT

A display device including: a plurality of display panels being adjacent to each other, each display panel having a display region including a plurality of pixels and a non-display region formed in a circumference of the display region. The display device includes a panel driver which drives the plurality of display panels and a controller which converts an image signal inputted from the outside to correspond to the plurality of display regions and the non-display region disposed between the plurality of display regions, extracts an image signal from the converted image signal corresponding to the respective display regions and supplies the extracted image signal to the panel driver to be displayed on the respective display regions.

17 Claims, 7 Drawing Sheets

(56) References Cited

U.S. PATENT DOCUMENTS

| | | |
|---|---|---|
| 2006/0007052 A1* | 1/2006 | Nakamura et al. ............ 345/1.2 |
| 2006/0028394 A1* | 2/2006 | Love et al. .................... 345/1.1 |
| 2006/0044215 A1 | 3/2006 | Brody et al. |
| 2007/0013708 A1 | 1/2007 | Barcklay et al. |
| 2007/0103386 A1* | 5/2007 | Hara et al. .................... 345/1.1 |
| 2007/0262916 A1* | 11/2007 | Kee et al. ...................... 345/1.3 |
| 2007/0262937 A1* | 11/2007 | Take et al. ........................ 345/87 |
| 2008/0001894 A1* | 1/2008 | Oh et al. ........................... 345/98 |
| 2012/0119977 A1* | 5/2012 | Asami ............................ 345/1.3 |

FOREIGN PATENT DOCUMENTS

| | | |
|---|---|---|
| JP | 11-134087 | 5/1999 |
| JP | 2000-321597 | 11/2000 |
| JP | 2001-242435 | 9/2001 |
| JP | 2002-44563 | 2/2002 |
| JP | 2003-66933 | 3/2003 |
| JP | 2003-169271 | 6/2003 |
| JP | 2003-525463 | 8/2003 |
| JP | 2004-46186 | 2/2004 |
| JP | 2004-233830 | 8/2004 |
| JP | 2005-17738 | 1/2005 |
| JP | 2005-31247 | 2/2005 |
| JP | 2006-303628 | 11/2006 |
| KR | 2002-0068284 | 8/2002 |
| KR | 2002-0070272 | 9/2002 |
| KR | 2004-0005665 | 1/2004 |
| KR | 10-2004-0056818 | 7/2004 |
| KR | 2006-0001334 | 1/2006 |
| KR | 2006-0001698 | 1/2006 |
| KR | 2006-0072737 | 6/2006 |
| KR | 2007-0019461 | 2/2007 |
| KR | 2007-0049662 | 5/2007 |
| KR | 2007-0050072 | 5/2007 |
| WO | 97-36281 | 10/1997 |
| WO | 2005-114637 A2 | 12/2005 |
| WO | 2006-023901 A2 | 3/2006 |

OTHER PUBLICATIONS

Patent Abstracts of Japan, Publication No. 11-134087, May 21, 1999, 1 p.
English Language Abstract, Publication No. JP2000321597, Nov. 24, 2000, 1 p.
English Language Abstract, Publication No. JP2001242435, Sep. 7, 2001, 1 p.
Patent Abstracts of Japan, Publication No. 2002-044563, Feb. 8, 2002, 1 p.
Patent Abstracts of Japan, Publication No. 2003-066933, Mar. 5, 2003, 1 p.
English Language Abstract, Publication No. JP2003169271, Jun. 13, 2003, 1 p.
English Language Abstract, Corresponding Document WO0154106 for Publication No. JP2003525463, Aug. 26, 2003, 2 pp.
Patent Abstracts of Japan, Publication No. 2004-046186, Feb. 12, 2004, 1 p.
Patent Abstracts of Japan, Publication No. 2004-233830, Aug. 19, 2004, 1 p.
Patent Abstracts of Japan, Publication No. 2005-017738, Jan. 20, 2005, 1 p.
Patent Abstracts of Japan, Publication No. 2005-031247, Feb. 3, 2005, 1 p.
Patent Abstracts of Japan, Publication No. 2006303628, Nov. 2, 2006, 1 p.
Korean Patent Abstracts, Publication No. 1020020068284, Aug. 27, 2002, 1 p.
Korean Patent Abstracts, Publication No. 1020020070272, Sep. 5, 2002, 1 p.
Korean Patent Abstracts, Publication No. 1020040005665, Jan. 16, 2004, 1 p.
Korean Patent Abstracts, Publication No. 1020060001334, Jan. 6, 2006, 1 p.
Korean Patent Abstracts, Publication No. 1020060001698, Jan. 6, 2006, 1 p.
Korean Patent Abstracts, Publication No. 1020060072737, Jun. 28, 2006, 1 p.
Korean Patent Abstracts, Publication No. 1020070019461, Feb. 15, 2007, 1 p.
Korean Patent Abstracts, Publication No. 1020070049662, May 11, 2007, 1 p.
Korean Patent Abstracts, Publication No. 1020070050072, May 14, 2007, 1 p.

* cited by examiner

DISPLAY DEVICE AND DRIVING METHOD THEREOF

CROSS-REFERENCE TO RELATED APPLICATION

This application claims priority from Korean Patent Application No. 10-2007-0103579, filed on Oct. 15, 2007, in the Korean Intellectual Property Office, the disclosure of which is incorporated herein by reference.

BACKGROUND OF THE INVENTION

1. Field of the Invention

The present invention relates to a display device and a driving method thereof, and more particularly, to a tiled display device including a plurality of display panels, and a driving method thereof.

2. Description of the Related Art

Recently, flat display devices such as liquid crystal displays (LCDs), and organic light emitting devices (OLEDs) have been widely adopted.

A digital information display requires a large screen since it is mainly used in public places. Currently, a single flat screen display device having a 100-inch screen or more is not commonly available. Such a large-size, single flat screen display device is very expensive. Accordingly, several small-size display devices are connected to each other to form a large size display device, which is generally referred to as a tiled display device.

The tiled display device drives several display panels which appear as a single screen. The tiled display device divides an original image into the number of display panels and drives the divided images through the respective display panels. Each of the display panels includes a display region to form an image thereon, and a cover provided in an external part of the display region to support the display panels.

As described above, a conventional tiled display device divides the original image into the number of the display panels to be driven by the original image. However, the overall image is distorted by the cover provided between the display panels. That is, the images on the display panels adjacent to each other are spaced as much as a width of the covers. Thus, the images formed on regions including the covers are distorted and look wider than those formed on the display panels.

SUMMARY OF THE INVENTION

An aspect of the present invention are achieved by providing a display device, including: a plurality of display panels positioned adjacent to each other, each of the plurality of display panels having a display region including a plurality of pixels and a non-display region formed in a circumference of the display region, a plurality of panel drivers coupled to the plurality of display panels, respectively, and a controller coupled to the panel drivers, the controller being operative to generate converted input image signals from input image signals received from the outside to correspond to the plurality of display regions and the non-display region disposed between the plurality of display regions, extract input image signals from the converted image signal corresponding to the respective display regions, and supply the extracted input image signal to the panel drivers for displaying on the respective display regions.

The controller may calculate a number of pixels corresponding to the non-display region based on a size of pixels in the display regions, or uses a number of pixels that is calculated and stored in advance corresponding to the non-display regions, and converts the input image signals from the outside to correspond to a total number of pixels including the number of pixels in the plurality of display regions and the number of pixels in the non-display regions disposed between the display regions.

The controller may divide the converted input image signals according to the plurality of display regions and the non-display regions disposed between the plurality of display regions, and supply input image signals corresponding to the respective display regions, among the divided image signals, to the panel drivers.

Each of the panel drivers may include coupled to an associated display panel having gate lines and data lines.

Each of the panel drivers may include a gate driver connected to the gate lines of its associated display panel, a data driver connected to the data lines of its associated display panel, and a signal controller receiving the input image signals from the controller and controlling the gate driver and the data driver.

Another aspect of the present invention are also achieved by providing a display device, including: a plurality of display panels being adjacent to each other, the each display panel has a display region having a plurality of pixels and a non-display region formed in a circumference of the display region, a plurality of panel drivers which drive the plurality of display panels, respectively, and a controller coupled to the panel drivers, the controller being operative to divide input image signals from the outside according to the plurality of display regions and the non-display regions disposed between the plurality of display regions, extract input image signals from the divided input image signals corresponding to the respective display regions, convert the extracted input image signals to correspond to the number of pixels in the respective display regions, and supply the converted input image signals to the panel drivers to be displayed on the respective display regions.

A aspect of the present invention are also achieved by providing a driving method of a display device having a plurality of display panels and panel drivers coupled to the display panels, the display panels being adjacent to each other, each display panel having a display region having a plurality of pixels and a non-display region disposed in a circumference of the display region, including: converting input image signals received from the outside to correspond to the plurality of display regions and the non-display regions disposed between the plurality of display regions, extracting input image signals from the converted input image signals corresponding to the respective display regions, and supplying the extracted input image signals to the panel drivers to be displayed on the respective display regions.

The driving method may further include calculating the number of pixels corresponding to the non-display region based on a size of pixels in the display regions or using the number of pixels that is calculated and stored in advance corresponding to the non-display region before the converting the signal inputted from the outside. The converting of the input image signals from the outside may include converting the input image signals from the outside to correspond to a total number of pixels including the number of pixels in the plurality of display regions and the number of pixels in the non-display regions disposed between the plurality of display regions.

The driving method may further include dividing the converted input image signals according to the plurality of display regions and the non-display region disposed between the plurality of display regions between the converting and supplying the input image signals. The supplying of the input image signals may include supplying input image signals corresponding to the respective display regions, among the divided input image signals, to the panel drivers.

The panel driver may include a gate driver connected to the gate lines, a data driver connected to the data lines, and a signal controller receiving the input image signals from the controller and controlling the gate driver and the data driver.

An further aspect of the present invention are achieved by providing a display device, including: a plurality of display panels which is adjacent to each other, each display panel has a display region having a plurality of pixels and a non-display region formed in a circumference of the display region, a plurality of panel drivers coupled to the plurality of display panels, respectively, a first controller coupled to the panel drivers, the first controller being operative to generate converted input image signals from the outside to correspond to the plurality of display regions and the non-display regions disposed between the plurality of display regions, extract input image signals from the converted input image signals corresponding to the respective display regions, and supply the extracted input image signals to the panel drivers to be displayed on the respective display regions, a second controller coupled to the panel drivers, the second controller being operative to generate converted input image signals from the outside to correspond to the plurality of display regions, extract input image signals from the converted input image signals corresponding to the respective display regions, and supply the extracted input image signals to the panel drivers to be displayed on the respective display regions, and a selection unit coupled to the first controller and the second controller, the selection unit being operative to select one of the first controller and the second controller.

The selection unit may be user controlled to select one of the first controller and the second controller.

The selection unit may determine whether the input image signals from the outside includes a text image signal, and select the second controller when the input image signals from the outside includes the text image signal.

The first controller may calculate the number of pixels corresponding to the non-display regions based on a size of pixels in the display regions, use the number of pixels that is calculated and stored in advance corresponding to the non-display regions, and convert the input image signals from the outside to correspond to a total number pixels including the number of pixels in the plurality of display regions and the number of pixels in the non-display regions disposed between the display regions.

The first controller may divide the converted input image signals according to the plurality of display regions and the non-display regions disposed between the plurality of display regions, and supply the input image signals corresponding to the respective display regions, among the divided input image signals, to the panel drivers.

Each of the panel drivers may be connected to an associated display panel having gate lines and data lines.

The second controller may convert the input image signals from the outside to correspond to the number of pixels in the plurality of display regions, divide the converted input image signals according to the plurality of display regions, and supply the input image signals corresponding to the respective display regions among the divided input image signals to the panel drivers.

A further still aspect of the present invention are achieved by providing a driving method of a display device having a plurality of display panels and panel drivers coupled to the display panels, the display panels being adjacent to each other, each display panel having a display region having a plurality of pixels and a non-display region disposed in a circumference of the display regions, including: determining whether input image signals received from the outside have a text image signal, converting input image signals received from the outside to generate first converted input image signals corresponding to the plurality of display regions when the input image signals has the text image signal, converting the input image signals received from the outside to generate first converted input image signals corresponding to the plurality of display regions and second converted input image signals corresponding to the non-display regions disposed between the display regions when the input image signals have not the text image signal, extracting first input image signals from the first converted input image signals corresponding to the respective display regions, and supplying the extracted first input image signals to the panel drivers to be displayed on the respective display region.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Hereinafter, a liquid crystal display device will be described as an example of a display device. Accordingly, a liquid crystal panel will be described as an example of a display panel. However, the present invention is not limited to the liquid crystal display device, and may be applicable to other types of display devices such as an organic light emitting device.

[First Exemplary Embodiment]

A display device according to a first exemplary embodiment of the present invention will be described with reference to FIGS. 1 and 2.

Figure 1:
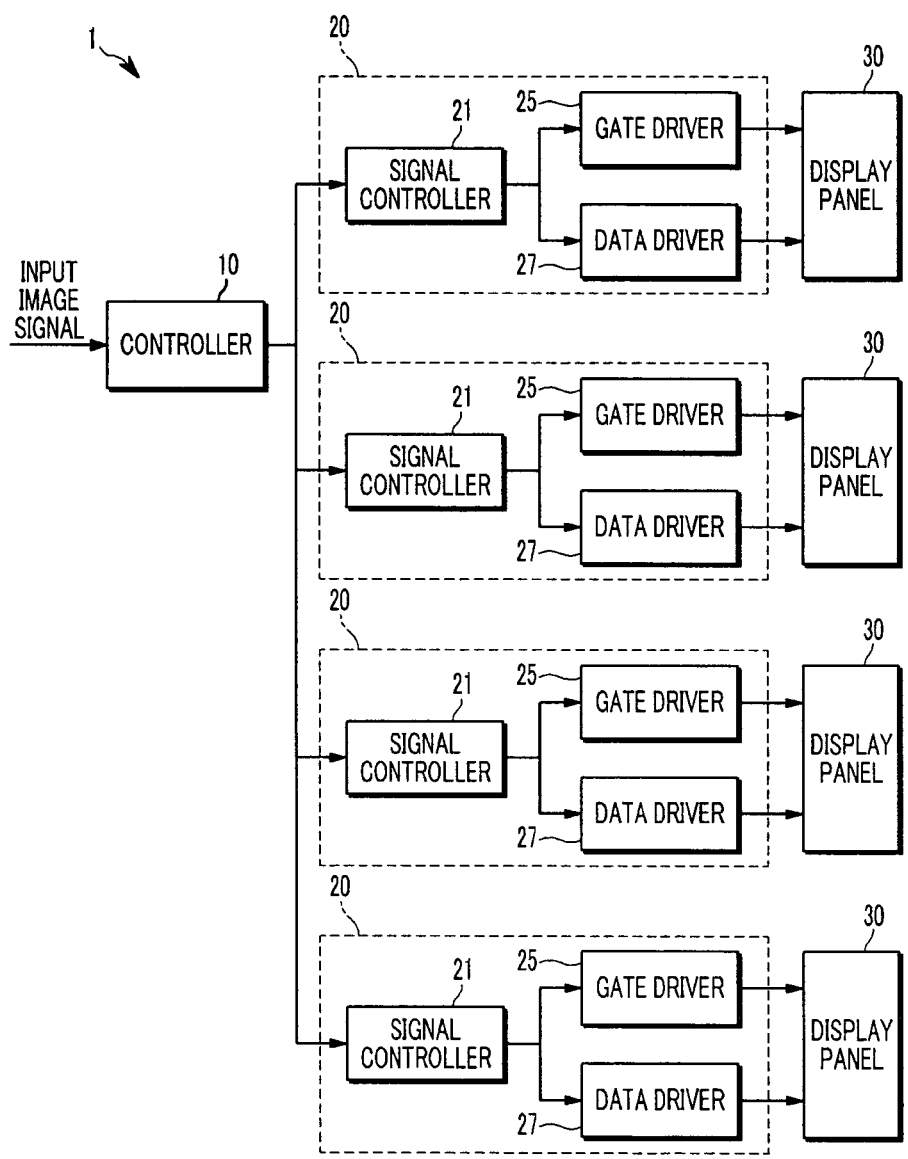
FIG. 1 is a block diagram of a display device according to a first exemplary embodiment of the present invention.
Figure 2:
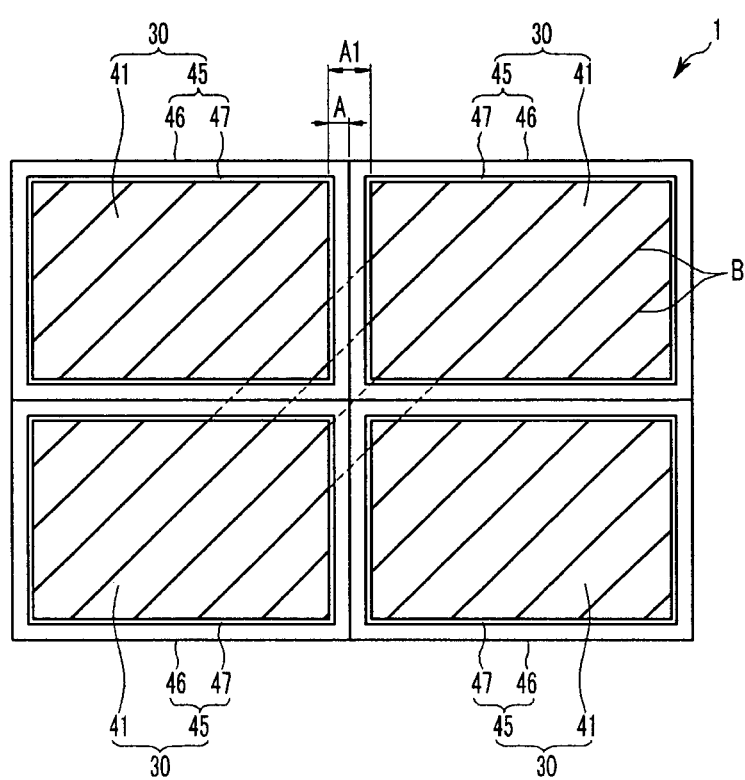
FIG. 2 is a schematic layout view of display panels according to a first exemplary embodiment of the present invention.

FIG. 1 is a block diagram of a display device according to a first exemplary embodiment of the present invention and FIG. 2 is a schematic layout view of display panels according to a first exemplary embodiment of the present invention.

As shown in FIG. 1, a display device 1 according to a first exemplary embodiment of the present invention includes a plurality of display panels 30 which are adjacent to each other, a plurality of panel drivers 20 which drive the display panels 30, respectively, and a controller 10 which controls to display image signals inputted from the outside on the respective display panels 30.

Each of the panel drivers 20 includes a signal controller 21, a gate driver, 25, and a data driver, etc.

As shown in FIG. 2, the display device 1 includes four display panels 30 which are adjacent to each other, as an example of the present invention. That is, four display panels 30 are arranged in a 2 (in transverse direction)×2(in vertical direction) matrix pattern to be adjacent each other. Alternatively, the display panels 30 may be arranged in other patterns such as 1×5, 3×3, or 20×20 patterns.

Figure 3:
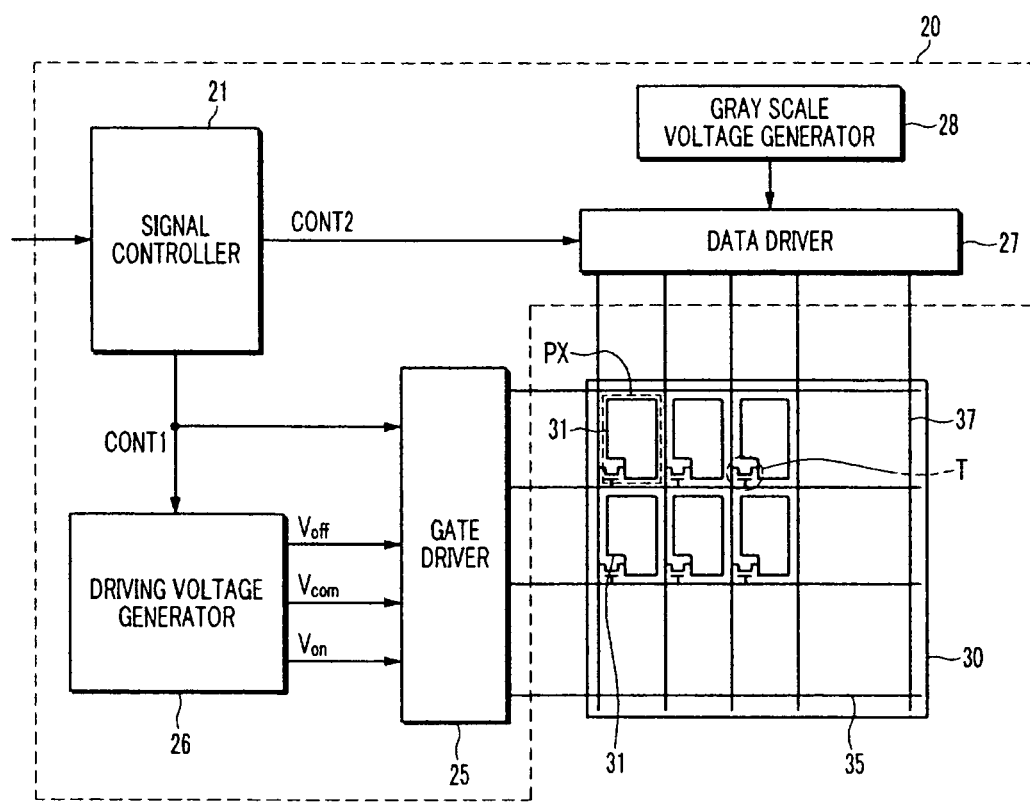
FIG. 3 is a block diagram of a display panel and a panel driver according to a first exemplary embodiment of the present invention.

As shown in FIGS. 2 and 3, each of the display panels 30 include a display region 41 having a plurality of pixels PX, and a non-display region 45 formed circumferentially of the display region 41.

A plurality of gate lines 35 and a plurality of data line 37 are formed in the display panels 30. The gate lines 35 and the data lines 37 are insulated from and intersect each other in the display panels 30. Each of the gate lines 35 and each of the data lines 37 may include a single layered structure made of a metal or amulti-layered structure made of metals.

The gate lines 35 are connected to the gate driver 25 of the panel driver 20 to apply gate signals from the gate driver 25 while the data lines 37 are connected to a data driver 27 of the panel driver 20 to apply data voltages from the data driver 27. The gate signal includes a gate on voltage and a gate off voltage.

The display region 41 includes a plurality of pixels PX to display images on the display panels 30.

Each pixel PX is formed in an intersection area of the gate line 35 and the data line 37.

Each pixel PX includes a thin film transistor T and a pixel electrode 31.

The thin film transistor T is a switching element having three terminals: an input terminal, a control terminal, and an output terminal.

The control terminal is connected to one gate lines 35, the input terminal is connected to one the data line, and the output terminal is connected to the pixel electrode 31. Thereby, when the thin film transistors that are connected to the same gate line 35 T are driven, turned on, by the gate on signal through the gate line 35, and data voltages are applied to the pixel electrodes 31 that are connected to the tuned on transistors T through the data lines 37.

The pixels PX include red (R) pixels, green (G) pixels, and blue (B) pixels. Different-colored pixels PX are formed by different-colored filters or light emitting layers emitting different colored light.

Alternatively, the pixels PX may include four pixels such as red (R), green (G), blue (B), and white (W) pixels. The number of pixels PX in the respective display regions 41 may vary depending on resolution. For example, the number of pixels at HD (high definition)-level resolution is (1366×3) (in transverse direction)×(768×3) (in vertical direction).

The display region 41 further includes a light blacking member (referring to as "a black matrix") preventing light leakage between the pixel electrodes 31 and including opening areas facing the pixel electrodes 31.

Referring to FIG. 2, the non-display regions 45 are provided in the circumference of the display regions 41 and do not display images. Each of the non-display regions 45 includes a cover 46 which is provided in the circumference of the display panel 30 to support the display panel 30.

In this embodiment of the present invention, black matrixes are extended to portions of the non-display regions 45. As shown in FIG. 2, each of the black matrixs is extended to the circumference of the display region 41 and exposed in the circumference of the display region 41. If the cover 46 covers the black matrix 47, the non-display region 45 may only refer to the cover 46.

A width A of the non-display region 45 is also called a width of a bezel, and may vary depending on the size of the corresponding display panel 30. For example, the width A of the non-display region 45 may be approximately about 20 mm when the display panel 30 is about 40 inches size. A width A1 of the non-display regions 45 disposed between the two adjacent display regions 41 is about twice the width A that of the non-display region 45 in the respective display panels 30. That is, when the display panel 30 is about 40 inches, the width A1 of the non-display regions 45 disposed between the respective display regions 41 may be approximately about 40 mm. As an example of the present invention, the width A of the non-display region 45 is substantially equivalent in a transverse direction and in a vertical direction, but not limited thereto. Alternatively, the width A of the non-display region 45 in a transverse direction and in a vertical direction may be different depending on the display panel 30.

Referring to FIG. 3, a structure of the panel driver 20 will be described in more detail.

FIG. 3 is a block diagram of a display panel and a panel driver according to a first exemplary embodiment of the present invention.

Referring to FIG. 3, each panel deriver 20 further includes a driving voltage generator 26 and a gray scale voltage generator 28 as well as the signal controller 21, the gate driver 25, and the data driver 27.

The signal controller 21 is supplied with input image signals and input control signals for controlling the display the input image signals from the controller 10.

The signal controller 21 processes the input image signals and generates control signals CONT1 and CONT2 to control operations of the gate driver 25, the data driver 27, the driving voltage generator 26, and the gray scale voltage generator 28.

The signal controller 21 transmits gate control signals CONT1 to the gate driver 25 and the driving voltage generator 26, and transmits data control signals CONT2 to the data driver 27. In FIG. 3, the signal controllers 21 are provided to be included in the respective panel drivers 20, but not limited thereto. Alternatively, only one single signal controller may be provided and included in the controller 10.

The driving voltage generator 26 generates a gate on voltage Von to turn on the thin film transistor T, a gate off voltage Voff to turn off the thin film transistor T, and a common voltage Vcom to be applied to a common electrode (not shown).

The gray scale voltage generator 28 generates a plurality of gray scale voltages related to brightness based on the gate control signals CONT1 from the signal controller 21.

The gate driver 25 is referred to as a scan driver.

As described above, the gate driver 25 is connected to the gate lines 35 to apply gate signals combining a gate on voltage and a gate off voltage from the driving voltage generator 26 to the gate lines 35, based on the gate control signals CONT1 from the signal controller 21.

The data driver 27 is referred to as a source driver. The data driver 27 receives gray scale voltages from the gray scale voltage generator 28, and selects gray scale voltages corresponding image signals from the signal controller 21 among all the gray scale voltages to apply the selected gray scale voltages as data voltages to the corresponding data lines 37 according to the data control signal CONT2 from the signal controller 21.

At least one gate driving IC of the gate driver 25 or at least one data driving ICs of the data driver 27 may be mounted in a tape carrier package (TCP) (not shown) to be attached to the display panel 30. Alternatively, the ICs may be directly mounted to an insulating substrate (not shown) forming the display panel 30 according to COG (chip on glass) method, or circuits performing the same function as those ICs do may be directly provided in the display panel 30.

The controller 10 is supplied with input image signals and input control signals from an external and processes the input image signals and the input control signals to be suitable for the operations of the display panels 30 to transmit the processed input image signals and the input control signals to the panel drivers 20 and display proper images on the plurality of display panels 30.

The controller 10 performs a scaling function dividing the input image signals and the input control signals for the plurality of display panels 30 and supplying the divided input signals and control signals to the respective panel drivers 20 to display corresponding images on the respective display panels 30.

The controller 10 converts the input image signal to create a plurality of input image signals for applicating to the plurality of display regions 41 and the non-display regions 45 disposed between the plurality of display regions 41. The controller 10 extracts from the converted input image signals input image signals for application to the respective plurality of display regions 41, and supplies the extracted input image signals to the panel drivers 20 to be displayed on the respective display regions 41.

At this time, for the above operation, the controller 10 may calculate the number of pixels PX corresponding to the non-display regions 45 based on a size of pixels in the display regions 41, or uses the number of pixels PX calculated and stored in advance, corresponding to the non-display regions 45, and at this time, the controller 10 may convert the input image signals to correspond to a total number of pixels PX including the number of pixels in the plurality of display regions 41 and the number of pixels in the non-display regions 45 disposed between the display regions 41. Alternatively, the controller 10 may extract the input image signals corresponding to the respective display regions 41 from the input image signal inputted from the outside, convert the extracted input image signals corresponding to the plurality of display regions 41, and supply the converted input image signals to the respective panel drivers 20 to be displayed on the respective display regions 41.

The controller 10 may divide the converted input image signals into input image signals for the plurality of display regions 41 and input image signals for the non-display regions 45 disposed between the plurality of display regions 41. At this time, the controller 10 may supply the input image signals for corresponding to the respective display regions 41, among the divided input image signals, to the signal controllers 21 of the corresponding panel drivers 20. Alternatively, the controller 10 may divide the input image signals inputted from the outside according to the plurality of display regions 41 and the non-display regions 45 disposed between the plurality of display regions 41, extract input image signals from the divided image signals corresponding to the respective display regions 41 to convert the extracted signals corresponding to the number of pixels in the respective display regions 41, and supply the converted image signals to the signal controllers 21 of the panel drivers 20 to be displayed on the respective display regions 41.

A driving method of the display device 1 according to the first exemplary embodiment of the present invention is described with reference to FIG. 4.

Figure 4:
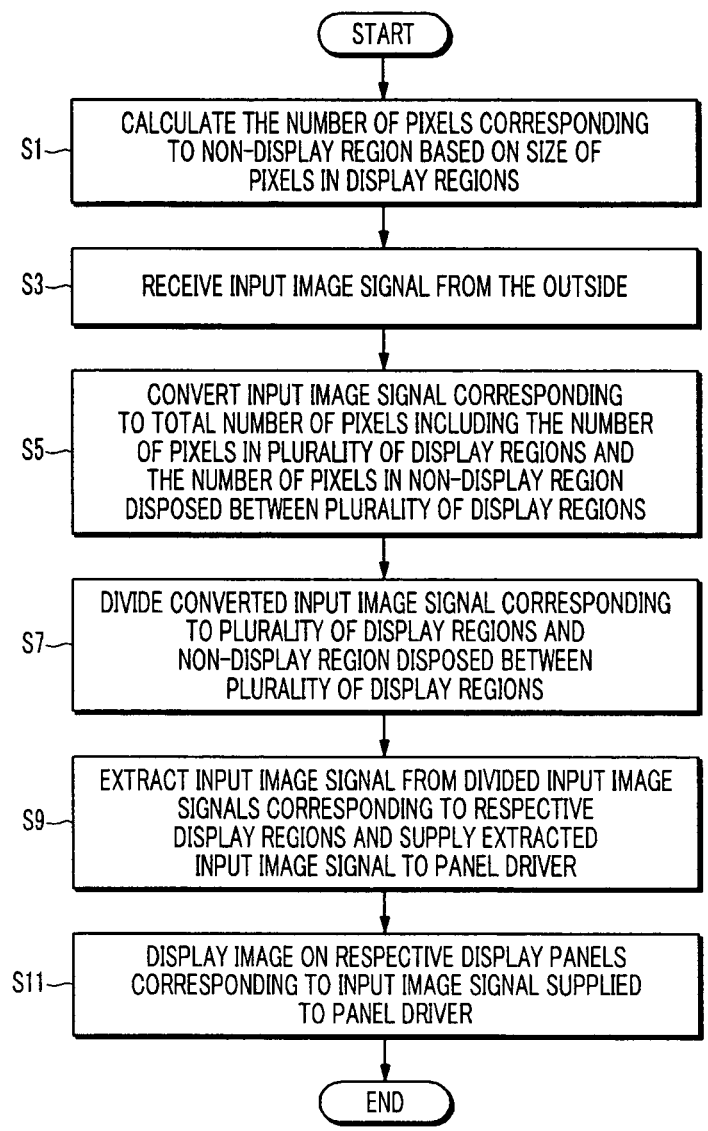
FIG. 4 is a flowchart of a controller according to a first exemplary embodiment of the present invention.

FIG. 4 is a flowchart of a controller according to a first exemplary embodiment of the present invention.

First, the controller 10 calculates the number of pixels PX corresponding to the non-display regions 45 based on the size of pixels PX formed in the display regions 41 (S1). As shown in FIG. 2, the display device 1 includes e.g., four display panels 30 in a 2×2 pattern. In this embodiment, the respective display panels 30 are about 40 inches at HD-level resolution, and the width A of the non-display region 45 is about 20 mm. Here, the number of pixels PX formed on the non-display region 45 is calculated based on the size of a single pixel formed on the display regions 41. That is, the number of pixels PX corresponding to the non-display region 45 in the transverse direction may be calculated by dividing the width A of the non-display region 45 in the transverse direction by the length of a single pixel PX formed in the display regions 41 in the transverse direction. With a similar method, the number of pixels PX corresponding to the non-display regions 45 in a vertical direction may be calculated.

According to the first exemplary embodiment of the present invention, the length of the pixel PX in the transverse direction and in the vertical direction is substantially equivalent, but not limited thereto. Alternatively, the length of the pixel PX in the transverse direction and in the vertical direction may differ depending on the size of the display panels 30.

According to the present invention, the controller 10 calculates the number of pixels PX corresponding to the non-display regions 45, but not limited thereto. That is, alternatively, since the number of pixels PX corresponding to the non-display regions 45 may recognize during a manufacturing process of the display device 1, to store in a storage unit (not shown) provided in the controller 10. Thereby, the controller 10 may use the stored number of pixels PX corresponding to the non-display regions 45 without the calculation operation.

The controller 10 receives input image signals from the outside (S3). The input image signals from the outside are input image signals have HD-level resolution, but may be input image signals having full high definition (FHD)-level resolution (1920×1080) and so on.

The input image signals are converted corresponding to the total number of pixels PX including the number of pixels PX in the plurality of display regions 41 and the number of pixels PX in the non-display regions 45 disposed between the plurality of display regions 41 (S5). As the four display panels 30 are arranged in a 2×2 pattern as in FIG. 2, the total number of pixels PX in the transverse direction includes the number of pixels PX in the two display regions 41 in the transverse direction and the number of pixels PX in the non-display regions 45 disposed between two adjacent display regions 41 in the transverse direction. With the similar method, the total number of pixels PX in the vertical direction may be calculated. The controller 10 converts the input image signals corresponding to the total calculated number of the pixels PX in the display device 1. That is, the controller 10 converts the resolution of the input HD-level image signals according to the number of the calculated overall pixels.

The converted input image signals are divided into input image signals for the plurality of display regions 41 and input image signals for the non-display regions 45 disposed between the plurality of display regions 41 (S7). Since the four display panels 30 are arranged in a 2×2 pattern as shown in FIG. 2, the image signals is divided into input image signals for the four display regions 41 and input image signals for the non-display regions 45 disposed therebetween.

Then, the input image signals corresponding to each display region 41 are extracted from the divided input image signals to be supplied to the panel driver 20 for the corresponding display region 41 (S9). That is, only the input image signals corresponding to the respective display regions 41, among the divided image signals, are supplied to the panel drivers 20 of the corresponding display panels 30 while the image signals corresponding to the respective non-display regions 45 are not supplied to the panel drivers 20 of the corresponding display panels 30.

The respective display panels 30 display images based on the input image signals supplied to the respective panel drivers 20 (S11).

Alternatively, the controller 10 may divide the input image signals inputted from the outside according to the plurality of display regions 41 and the non-display regions 45 disposed between the plurality of display regions 41, and then extract the input image signals from the divided image signals corresponding to the respective display regions 41. Then, the controller 10 may convert the extracted input image signals to correspond to the number of pixels in the respective display regions 41 and supply the converted input image signals to the signal controllers 21 of the corresponding panel drivers 20 to be displayed on the respective display regions 41.

According to the first exemplary embodiment of the present invention, the display device 1 displays images based on only the image signals corresponding to the respective display regions 41 on the display panels 30, among the divided input image signals, and does not display images based on the input image signals corresponding to the non-display regions 45 on the display panels 30 to thereby prevent a distortion of the images. That is, as shown in FIG. 2, the diagonal lines B in the respective display regions 41 are straight along dotted lines even if the non-display regions 45 are present, thereby preventing the distortion due to the non-display regions 45.

[Second Exemplary Embodiment]

A display device 100 according to a second exemplary embodiment of the present invention will be described with reference to FIGS. 5 and 6.

Figure 5:
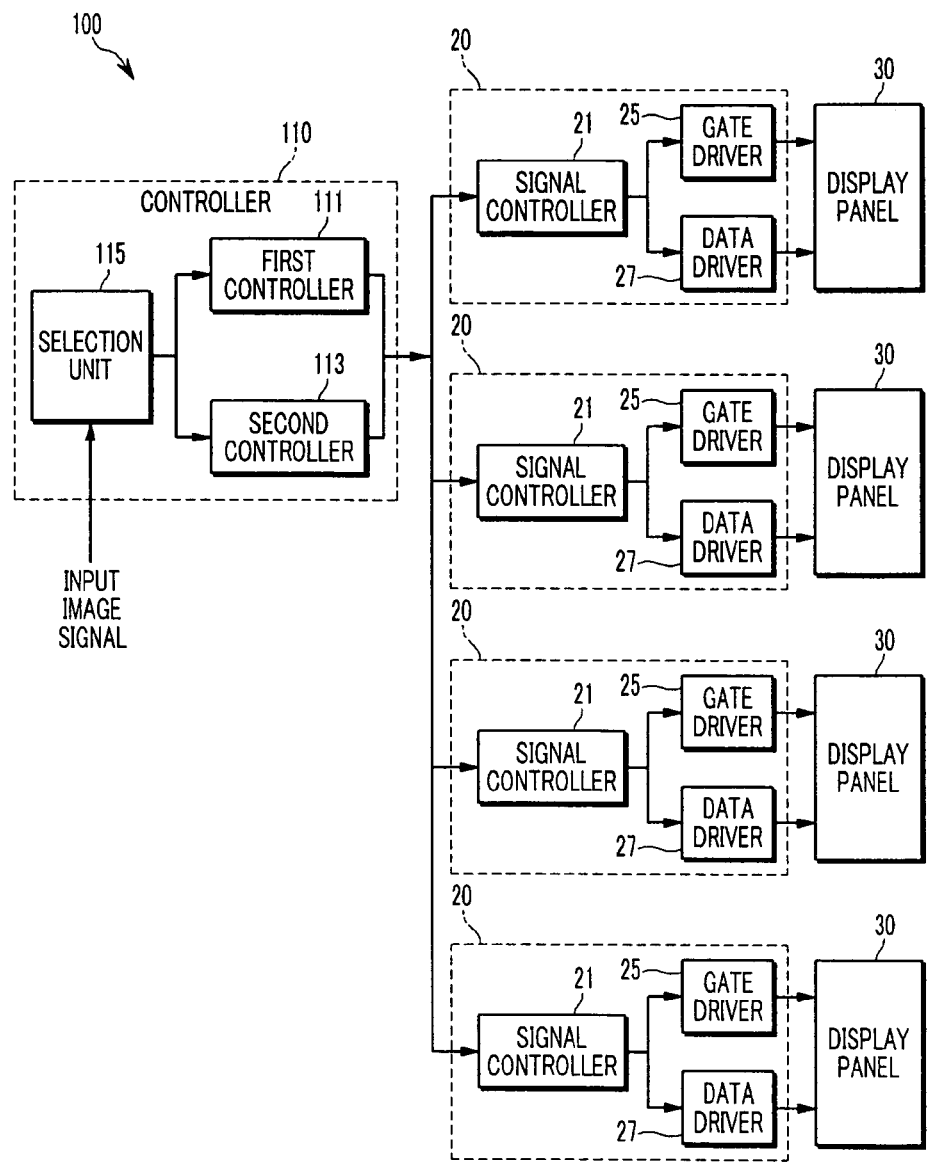
FIG. 5 is a block diagram of a display device according to a second exemplary embodiment of the present invention.
Figure 6:
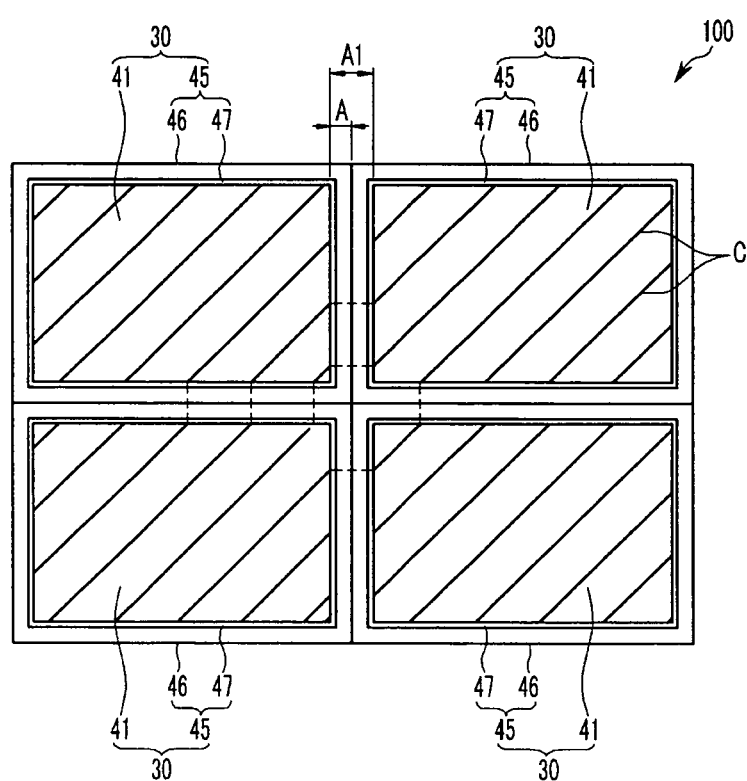
FIG. 6 is a schematic layout view of a display panels according to a second exemplary embodiment of the present invention.

FIG. 5 is a block diagram of a display device according to a second exemplary embodiment of the present invention and FIG. 6 is a schematic layout view of a display panels according to a second exemplary embodiment of the present invention.

Referring to FIGS. 5 and 6, a display device 100 according to a second exemplary embodiment of the present invention includes a plurality of display panels 30 which are adjacent to each other, a plurality of panel drivers 20 which drive the plurality of display panels 30, respectively, and a controller 110 which controls to display input image signals inputted from the outside on the respective display panels 30, in similar to that shown in FIG. 1.

The display panels 30 and the panel driver 20 according to the second exemplary embodiment are equivalent to those according to the first exemplary embodiment. Thus, the detailed description will not be repeated. Hereinafter, the controller 110 will be described in detail.

The controller 110 includes a first controller 111 and a second controller 113 which differently control the input image signals from the outside to display images on the respective display panels 30, and a selection unit 115 which is provided to select one of the first and second controllers 111 and 113.

The first controller 111 converts the input image signals from the outside to correspond to the plurality of display regions 41 and the non-display regions 45 disposed between the plurality of display regions 41, and extracts input image signals from the converted input image signals corresponding to the respective display regions 41 to be supplied to the panel drivers 20 and to be displayed on the respective display regions 41.

The first controller 111 may calculate the number of pixels corresponding to the non-display regions 45 based on the size of pixels in the display regions 41 or may use a predetermined umber of pixels corresponding to the non-display regions 45 stored in a storing unit (not shown), and the first controller 111 may convert the input image signals to correspond to the total number of pixels including the number of pixels in the plurality of display regions 41 and the number of pixels in the non-display regions 45 disposed between the plurality of display regions 41. The first controller 111 may divide the converted input image signals according to the plurality of display regions 41 and the non-display regions 45 disposed between the plurality of display regions 41. The first controller 111 may supply the input image signals, among the divided image signals, corresponding to the respective display regions 41 to the panel driver 20. The first controller 111 is substantially equivalent to controller 10 of the first exemplary embodiment. Thus, a detailed description will not be repeated.

The second controller 113 converts the input image signals from the outside to correspond to the plurality of display regions 41, extracts the input image signals corresponding to the respective display regions 41 from the converted input image signals, and supplies the extracted input image signals to the respective panel drivers 20 to be displayed on the respective display regions 41.

The second controller 113 may convert the input image signals from the outside to correspond to the number of pixels in the plurality of display regions 41. That is, the second controller 113 converts the resolution of the input image signals from the outside to correspond to the number of pixels in the plurality of display regions 41 only, unlike the first controller 111. The second controller 113 may divide the converted input image signals according to the plurality of display regions 41. That is, the second controller 113 divides the converted input image signals according to the plurality of display regions 41 only without considering the non-display regions 45 unlike the first controller 111. The second controller 113 may supply the input image signals corresponding to the respective display regions 41, among the divided image signals, to the respective panel driver 20 corresponding to the respective display panels 30.

As the second controller 113 divides the input image signals according to the plurality of display regions 41 only and supplies the divided input image signals to the corresponding panel drivers 20 of the display panels 30, the distortion of images displayed on the display device 100 is not prevented. When the display device 100 according to the second exemplary embodiment of the present invention is driven by the second controller 113, the diagonal lines C in the respective display regions 41 in FIG. 6 are not straight along the dotted lines in the non-display regions 45. Thus, the images displayed on the respective display regions 41 are distorted.

However, when the input image signals from the outside includes text image signals for displaying text such as letters, etc., the input image signals are preferably controlled by the second controller 113 since information included in the text is more important than the image distortion.

The selection unit 115 selects one of the first and second controllers 111 and 113 by a user. That is, the selection unit 115 is provided in a control panel (not shown) of the display device 100 or in an external of the display device 100 so that a user can select one of the controllers 111 and 113. For example, a user preferably selects the second controller 113 when input image signals inputted from the outside are text image signals since the information included in the text is more important than the prevention of the image distortion. Meanwhile, when input image signals inputted from the outside are picture image signals for displaying pictures, a user may preferably select the first controller 111 to prevent the image distortion.

Alternatively, the selection unit 115 may determine whether the input image signals from the outside includes text image signals, and select the second controller 113 when the input image signals includes the text image signals without operation of the user. That is, the selection unit 115 may determine whether the input image signals from the outside includes text image signals, and select the second controller 113 when the input signals include the text image signals and select the first controller 111 when the input image signals includes picture image signals. Alternatively, the first controller 111, the second controller 115, or other additional units may determine whether the input image signals from the outside includes text image signals instead of the selection unit 115. The function of determining whether the input image signals from the outside include the text image signals is known in the art. Thus, the detailed description will be avoided.

According to the second exemplary embodiment of the present invention, the selection unit 115 determines whether the input image signals include text image signals, and selects one of the first and second controllers 111 and 113.

Alternatively, a user may select one of the first and second controllers 111 and 113. At this time, the selection unit 115 may have a function of determining the input image signals and selecting one of the first and second controllers 111 and 113, and a function of selecting one of the first and second controllers 111 and 113 based on the selection of a user. When the two functions are provided, the selection by a user applies prior to the selection of the selection unit 115.

Figure 7:
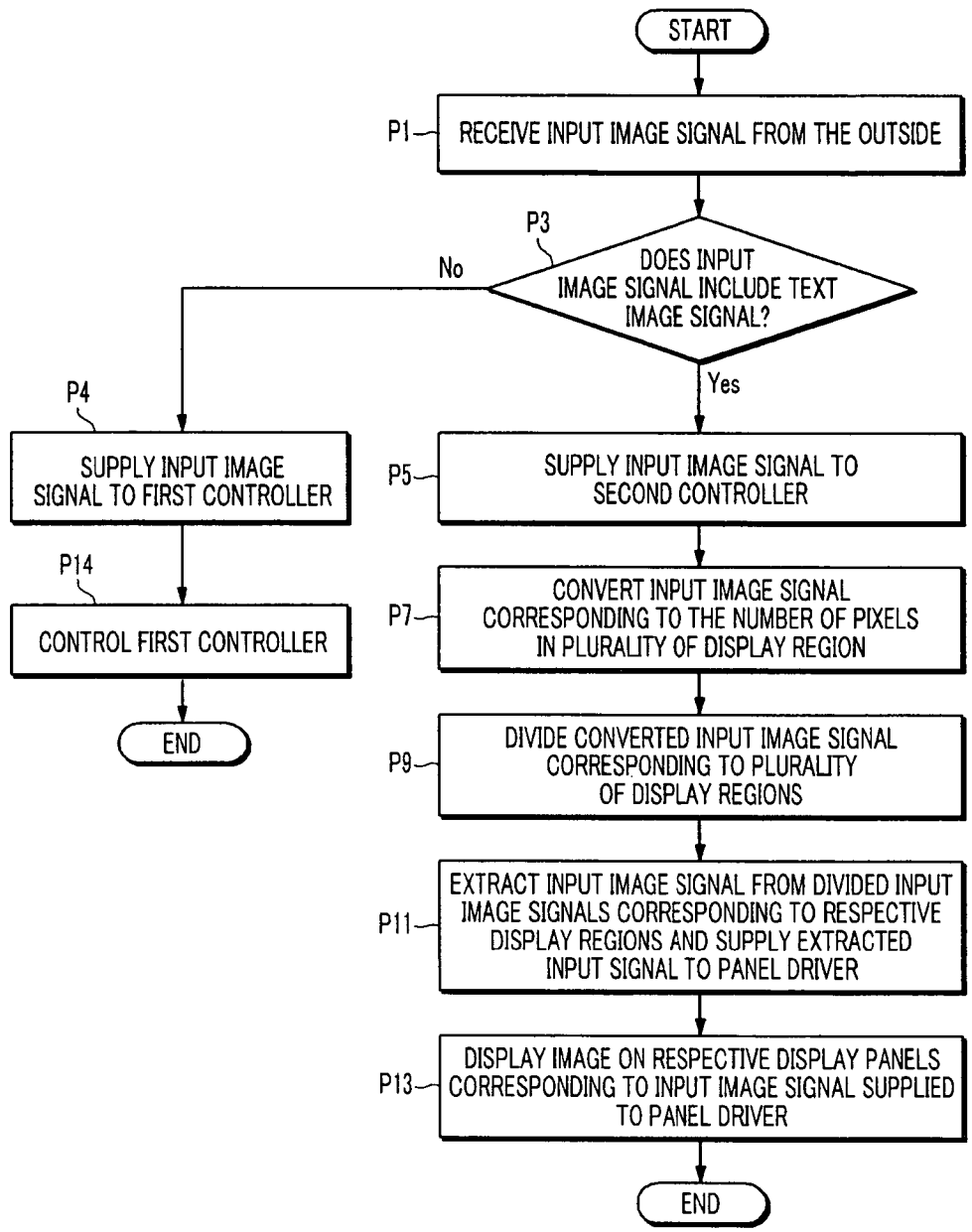
FIG. 7 is a flowchart of a controller according to a second exemplary embodiment of the present invention.

A driving method of the display device 100 according to the second exemplary embodiment of the present invention is described below with reference to FIG. 7. FIG. 7 is a flowchart of a controller according to a second exemplary embodiment of the present invention.

First, the selection unit 115 receives input image signals from the outside (P1). The selection unit 115 determines whether the input image signals includes text image signals (P3). The selection unit 115 selects the second controller 113 and supplies the input image signals to the second controller 113 when the input image signals includes the text image signals (P5). When the input image signals includes picture image signals, the selection unit 115 selects the first controller 111 and supplies the input image signals to the first controller 111 (P4).

When the first controller 111 is selected, the driving method of the display device 100 is substantially equivalent to that of the display device 1 according to the first exemplary embodiment, and thereby the detailed description will be avoided (P14).

When the second controller 113 is selected, the input image signal of the second controller 113 is converted to correspond to the number of pixels in the plurality of display regions 41 (P7). That is, the controller 113 converts the resolution of the input image signals according to the number of pixels in the plurality of display regions 41.

The converted input image signals are divided according to the plurality of display regions 41 (P9). As the four display panels 30 are arranged in a 2×2 pattern in FIG. 6, the display regions 41 are divided into four regions.

Input image signals are extracted from the divided input image signals to correspond to the respective display regions 41 and to be supplied to the panel drivers 20 corresponding to the respective display regions 41 (P11). That is, among the divided input image signals, the input image signals corresponding to the respective display regions 41 are supplied to the panel drivers 20 of the respective display panels 30.

The respective display panels 30 display images corresponding to the input image signals supplied to the panel drivers 20 (P13).

According to the second exemplary embodiment of the present invention, the display device 100 selects the second controller 113 and displays the information about the input image signals on the display panels 30 when the input image signals include the text image signals, and selects the first controller 111 and displays images on the display panels 30 when the input image signals include the picture image signals based on a user's selection or determination of the selection unit 115, to thereby prevent the image distortion.

According to the present invention, a distortion of images displayed on a plurality of display panels may be prevented.

Also, a prevention of an image distortion may be selected by a user or depending on input image signals inputted from the outside.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display device, comprising:
   a plurality of display panels positioned adjacent to each other, the plurality of display panels having a plurality of display regions and a plurality of non-display regions disposed between the plurality of display regions;
   a plurality of panel drivers coupled to the plurality of display panels, respectively; and
   a controller coupled to the panel drivers, the controller being operative to generate converted image signals from input image signals using a total number of pixels that includes a number of pixels corresponding to the plurality of display regions and a number of pixels corresponding to the plurality of non-display regions, extract display image signals corresponding to the display regions from the converted image signals, and supply the display image signals to the panel drivers for displaying an image on the display regions.

2. The display device of claim 1, wherein the controller calculates the number of pixels corresponding to the plurality of non-display regions based on a size of pixels in the display regions, or uses a number of pixels that is calculated and stored in advance corresponding to the non-display regions.

3. The display device of claim 1, wherein the controller divides the converted image signals according to the plurality of display regions and the plurality of non-display regions, and supplies display image signals corresponding to the display regions, after the converted image signals have been divided, to the panel drivers.

4. The display device of claim 1, wherein each of the panel drivers is coupled to an associated display panel having gate lines and data lines.

5. The display device of claim 4, wherein each panel driver comprises a gate driver connected to the gate lines of its associated display panel, a data driver connected to the data lines of its associated display panel, and a signal controller receiving the input image signals from the controller and controlling the gate driver and the data driver.

6. A driving method of a display device having a plurality of display panels and panel drivers coupled to the display panels, the display panels being adjacent to each other, the plurality of display panels having a plurality of display regions and a plurality of non-display regions disposed between the plurality of display regions, the method comprising:
converting input image signals to generate converted image signals using a total number of pixels that includes a number of pixels corresponding to the plurality of display regions and a number of pixels corresponding to the non-display regions;
extracting display image signals corresponding to the display regions from the converted image signals; and
supplying the display image signals to the panel drivers for displaying an image on the display regions.

7. The driving method of claim 6, further comprising calculating the number of pixels corresponding to the plurality of non-display regions based on a size of pixels in the display regions, or using a number of pixels that is calculated and stored in advance corresponding to the non-display regions before the converting the input image signals.

8. The driving method of claim 7, further comprising dividing the converted image signals according to the plurality of display regions and the plurality of non-display regions between the converting and supplying.

9. The driving method of claim 8, wherein each of the panel drivers comprises a gate driver connected to gate lines of its associated display panel, a data driver connected to data lines of its associated display panel, and a signal controller receiving the input image signals from the controller and controlling the gate driver and the data driver.

10. A display device, comprising:
a plurality of display panels which are adjacent to each other, the plurality of display panels having a plurality of display regions and a plurality of non-display regions disposed between the plurality of display regions;
a plurality of panel drivers coupled to the plurality of display panels, respectively;
a first controller coupled to the panel drivers, the first controller being operative to generate first converted image signals from input image signals using a total number of pixels that includes a number of pixels corresponding to the plurality of display regions and a number of pixels corresponding to the plurality of non-display regions, extract first display image signals corresponding to the display regions from the first converted image signals, and supply the first display image signals to the panel drivers for displaying a first image on the display regions;
a second controller coupled to the panel drivers, the second controller being operative to generate second converted image signals from the input image signals using the number of pixels corresponds to the plurality of display regions, extract second display image signals corresponding to the display regions from the second converted image signals, and supply the extracted second display image signals to the panel drivers for displaying a second image on the display regions; and
a selection unit coupled to the first controller and the second controller, the selection unit being operative to select one of the first controller and the second controller.

11. The display device of claim 10, wherein the selection unit is user controlled to select one of the first controller and the second controller.

12. The display device according to claim 10, wherein the selection unit determines whether the input image signals comprises any text image signal, and selects the second controller when the input image signals comprises a text image signal.

13. The display device of claim 10, wherein the first controller calculates the number of pixels corresponding to the plurality of non-display regions based on a size of pixels in the display regions, or uses a number of pixels that is calculated and stored in advance corresponding to the non-display regions.

14. The display device of claim 13, wherein the first controller divides the first converted image signals according to the plurality of display regions and the plurality of non-display regions, and supplies the first display image signals corresponding to the display regions, after the converted image signals have been divided, to the panel drivers.

15. The display device of claim 10, wherein each of the panel drivers is coupled to an associated display panel having gate lines and data lines.

16. The display device of claim 10, wherein the second controller converts the input image signals to correspond to the number of pixels in the plurality of display regions, divides the second converted image signals according to the plurality of display regions, and supplies the second display image signals corresponding to the display regions to the panel drivers after the second converted image signals have been divided.

17. A driving method of a display device having a plurality of display panels and panel drivers coupled to the display panels, the display panels being adjacent to each other, the plurality of display panels having a plurality of display regions and a plurality of non-display regions disposed between the plurality of display regions, the method comprising:
determining whether input image signals received from outside include one or more text image signals;
converting the input image signals to generate first converted image signals using a number of pixels corresponding to the plurality of display regions when the input image signals include a text image signal;
converting the input image signals to generate second converted image signals using a total number of pixels that includes a number of pixels corresponding to the plurality of display regions and a number of pixels corresponding to the plurality of non-display regions when the input image signals do not include any text image signal;
extracting display image signals corresponding to the display regions from at least one of the first converted image signals and the second converted image signal; and
supplying the display image signals to the panel drivers for displaying an image on the display regions.

* * * * *